United States Patent
Tan Bergström et al.

(10) Patent No.: US 10,470,093 B2
(45) Date of Patent: Nov. 5, 2019

(54) CONNECTION ATTEMPT TO ALTERNATIVE ACCESS UPON CONNECTION ATTEMPT REJECTION

(71) Applicant: Telefonaktiebolaget LM Ericsson (publ), Stockholm (SE)

(72) Inventors: Mattias Tan Bergström, Stockholm (SE); Filip Mestanov, Sollentuna (SE); Oumer Teyeb, Solna (SE); Christofer Lindheimer, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/900,026

(22) Filed: Feb. 20, 2018

(65) Prior Publication Data
US 2018/0176842 A1    Jun. 21, 2018

Related U.S. Application Data

(63) Continuation of application No. 15/123,186, filed as application No. PCT/SE2015/050237 on Mar. 3, 2015.
(Continued)

(51) Int. Cl.
*H04W 36/14*     (2009.01)
*H04W 48/18*     (2009.01)
(Continued)

(52) U.S. Cl.
CPC ........... *H04W 36/14* (2013.01); *H04W 36/26* (2013.01); *H04W 48/18* (2013.01);
(Continued)

(58) Field of Classification Search
CPC ...... H04W 88/06; H04W 48/18; H04W 84/12
(Continued)

(56) References Cited

U.S. PATENT DOCUMENTS

6,792,284 B1 * 9/2004 Dalsgaard ......... H04W 36/0094
370/331
8,073,441 B1 * 12/2011 Unger ................... H04W 48/18
455/404.2

(Continued)

FOREIGN PATENT DOCUMENTS

| CN | 1485751 A | 3/2004 |
| CN | 101237689 A | 8/2008 |
| WO | 9839940 A2 | 9/1998 |

OTHER PUBLICATIONS

3GPP TR 37.834 V0.2.1, 3rd Generation Partnership Project; Technical Specification Group Radio Access Network; Study on WLAN/3GPP Radio Interworking (Release 12)—May 2013.

(Continued)

*Primary Examiner* — Jaime M Holliday
(74) *Attorney, Agent, or Firm* — Sage Patent Group (57) ABSTRACT

The invention relates to methods, user equipments, computer programs, computer program products and carriers for access network selection between a first network and a second network. Said first and second networks comprise one or more access candidates. An access network selection procedure is performed for one or more access candidates of the second network, sequentially performing for the access candidates of the second network connection establishing attempts to one or more access candidates, by selecting a new access candidate from said one or more access candidates, and performing connection establishing attempts to said access candidate until a connection to the access candidate is established or a stop criterion for said access candidate is fulfilled.

10 Claims, 9 Drawing Sheets

Related U.S. Application Data (60) Provisional application No. 61/947,310, filed on Mar. 3, 2014.

(51) Int. Cl.

| | | |
|---|---|---|
| *H04W 52/02* | (2009.01) | |
| *H04W 36/26* | (2009.01) | |
| *H04W 76/18* | (2018.01) | |
| *H04W 76/10* | (2018.01) | |
| H04W 36/00 | (2009.01) | |
| H04W 36/24 | (2009.01) | |
| H04W 88/06 | (2009.01) | |
| H04W 36/36 | (2009.01) | |
| H04W 72/12 | (2009.01) | |
| H04W 88/02 | (2009.01) | |
| H04W 28/08 | (2009.01) | |
| H04W 36/30 | (2009.01) | |
| H04W 72/02 | (2009.01) | |
| H04W 72/04 | (2009.01) | |

(52) U.S. Cl.
CPC ... *H04W 52/0245* (2013.01); *H04W 52/0258* (2013.01); *H04W 76/10* (2018.02); *H04W 76/18* (2018.02); *H04W 28/08* (2013.01); *H04W 36/0058* (2018.08); *H04W 36/0066* (2013.01); *H04W 36/0083* (2013.01); *H04W 36/00837* (2018.08); *H04W 36/24* (2013.01); *H04W 36/30* (2013.01); *H04W 36/36* (2013.01); *H04W 72/02* (2013.01); *H04W 72/0486* (2013.01); *H04W 72/1215* (2013.01); *H04W 88/02* (2013.01); *H04W 88/06* (2013.01); *Y02D 70/00* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01)

(58) Field of Classification Search
USPC .............................................. 455/435.2, 448
See application file for complete search history.

(56) References Cited

U.S. PATENT DOCUMENTS

| | | | |
|---|---|---|---|
| 2005/0013264 A1 | 1/2005 | Sundberg | |
| 2005/0096053 A1 | 5/2005 | Liu et al. | |
| 2005/0148299 A1* | 7/2005 | Buckley | H04W 48/18 455/41.2 |
| 2005/0221624 A1 | 10/2005 | Lee et al. | |
| 2005/0221824 A1* | 10/2005 | Lee | H04W 36/0066 455/435.2 |
| 2006/0009216 A1* | 1/2006 | Welnick | H04W 48/16 455/434 |
| 2008/0261655 A1 | 10/2008 | Carpenter et al. | |
| 2011/0286321 A1* | 11/2011 | Sureshchandran | H04W 76/19 370/216 |
| 2012/0155385 A1 | 6/2012 | Bencheikh | |
| 2012/0184267 A1 | 7/2012 | Dwyer et al. | |
| 2012/0257536 A1 | 10/2012 | Kholaif et al. | |
| 2013/0023265 A1 | 1/2013 | Swaminathan et al. | |
| 2013/0079009 A1* | 3/2013 | Aumann | H04W 16/02 455/436 |
| 2013/0083772 A1* | 4/2013 | Hata | H04W 76/19 370/331 |
| 2013/0235861 A1 | 9/2013 | Balasubramanian et al. | |
| 2015/0065143 A1* | 3/2015 | Hsu | H04W 36/0061 455/437 |

OTHER PUBLICATIONS

3GPP TS 24.302 V12.3.0, 3rd Generation Partnership Project; Technical Specification Group Core Network and Terminals; Access to the 3GPP Evolved Packet Core (EPC) via non-3GPP access networks; Stage 3 (Release 12)—Dec. 2013.

Intel Corporation, 3GPP TSG WG-RAN Meeting #62, New Work Rem Proposal: WLAN/3GPP Radio Interworking-Core, RP-132101, Korea, Buscan—Dec. 3-6, 2013.

3GPP TS 23.402 V12.3.0, 3rd Generation Partnership Project; Technical Specification Group Services and System Aspects; Architecture enhancements for non-3GPP accesses (Release 12)—Dec. 2012.

Intel Corporation, 3GPP TSG RAN Meeting #58, New Study Item Proposal on WLAN/3GPP Radio Interworking, RP-122038, Barcelona, Spain—Dec. 4-7, 2012.

3GPP TS 24.312 V12.3.0, 3rd Generation Partnership Project; Technical Specification Group Core Network and Terminals; Access Network Discovery and Selection Function (ANDSF) Management Object (MO) (Release 12)—Dec. 2013.

Fotiadis et al., Multi-Layer Traffic Steering: RRC Idle Absolute Priorities & Potential Enhancements, 2013 IEEE 77th Vehicular Technology Conference (VTC Spring)—Jun. 2, 2013.

Munoz et al., Mobility-Based Strategies for Traffic Steering in Heterogeneous Networks, IEEE Communications Magazine—May 1, 2013, pp. 54-62.

Huawe at al., 3GPP TSG RAN WG Meeting #83, Further clarifications on solution 3, R2-132780, Barcelona, Spain—Aug. 19-23, 2013.

3GPP TR 37.834 V0.2.0, 3rd Generation Partnership Project; Technical Specification Group Radio Access Network; Study on WLAN/3GPP Radio Interworking (Release 12)—Apr. 2013.

Ericsson et al., 3GPP TSG RAN WG2 #81bis, Idle mode access selection solution for WLAN/3GPP radio interworking, Tdoc R2-131390, Chicago, IL, USA—Apr. 15-19, 2013.

Intel Corporation, 3GPP TSG WG-RAN Meeting #62, New Work Item Proposal: WLAN/3GPP Radio Interworking-Feature, RP-132101, Korea, Buscan—Dec. 3-6, 201.

Office Action and Search Report for Chinese Application No. 201580009290.9, dated Mar. 5, 2019, 22 pages.

\* cited by examiner

CONNECTION ATTEMPT TO ALTERNATIVE ACCESS UPON CONNECTION ATTEMPT REJECTION

PRIORITY

This application is a continuation, under 35 U.S.C. § 120, of U.S. patent application Ser. No. 15/123,186, which is a U.S. National Stage Filing under 35 U.S.C. § 371 of International Patent Application Serial No, PCT/SE2015/050237, filed Mar. 3, 2015, and entitled "Connection Attempt To Alternative Access Upon Connection Attempt Rejection" which claims priority to U.S. Provisional Patent Application No. 61/947,310 filed Mar. 3, 2014, all of which are incorporated herein by reference.

TECHNICAL FIELD

The present technology relates to a method, a user equipment, a computer, a computer program product and a carrier for performing connection attempts to alternative access points and/or networks upon connection attempt rejection.

BACKGROUND

Most current Wi-Fi or WLAN deployments are totally separate from mobile networks, and can be seen as non-integrated from the user equipment, UE, perspective. Most operating systems, OSs, for UEs such as Android™ and ioS®, support a simple Wi-Fi offloading mechanism where a UE immediately switches all its IP traffic to a Wi-Fi network upon a detection of a suitable network with a received signal strength above a certain level. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks of the "W-Fi-if-coverage" strategy illustrated in FIG. 1. FIG. 1 illustrates examples of problems in FIGS. 1a)-1d) with "Wi-Fi-if-coverage" access network selection. Wi-Fi access selection today is performed by the UE with little consideration of radio performance, session/service continuity, load, mobility, etc.

Though the user/UE can save previous pass codes for already accessed Wi-Fi Access Points, APs, hotspot login for previously non-accessed APs usually requires user intervention, either by entering the pass code in Wi-Fi Connection Manager, CM, or using a web interface. The connection manager is software on a UE that is in charge of managing the network connections of the device, taking into account user preferences, operator preferences, network conditions, etc.

In FIGS. 1a-1d, a user equipment 10 has the possibility to connect to an AP of a mobile access network 20 or an AP of a Wi-Fi Access network 30. The mobile access network 20 may operate according to the 3GPP and/or LTE standards.

Figure 1A:
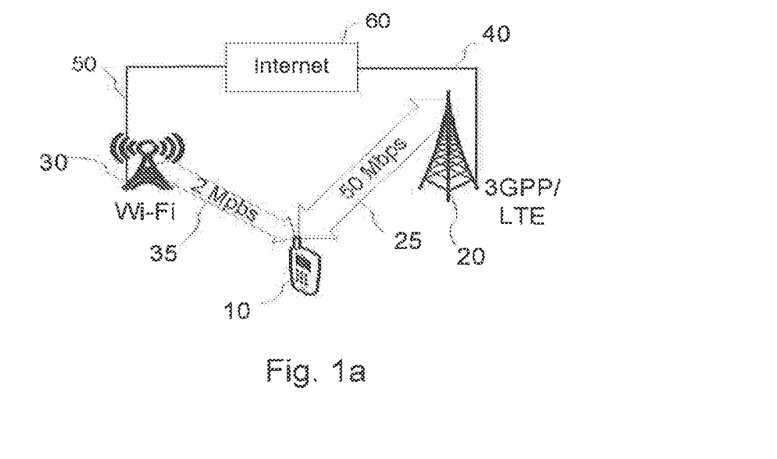
FIGS. 1a-1d are block diagrams describing problems with prior art solutions.

In FIG. 1a, is also illustrated that the mobile access network is connected to the Internet 60 via a backhaul network 40 and the Wi-Fi access network is connected to the Internet via a backhaul network 50. The backhaul network 40 of the mobile access network may in this example provide a high rate fibre connection. The Wi-Fi access network offers an low rate xDSL connection 50. e.g. 10/2 Mbps.

The UE may connect to the AP of either the mobile access network 20 via a connection 25 offering 50 Mbps bandwidth, or the AP of the Wi-Fi access network 30 via a connection 35 offering a rate of 2 Mbps.

No consideration of expected user experience is made except those considered in the UE 10 implemented proprietary solution, and this can lead to a UE 10 being handed over from a high data rate mobile network connection 25 to a low data rate Wi-Fi connection 35. Even though the UE's OS or some high level software is smart enough to make the offload decisions only when the signal level on the Wi-Fi connection 35 is considerably better than the mobile network link 25, there can still be limitations on the backhaul 40 of the Wi-Fi AP 30 that may end up being the bottleneck.

Figure 1B:
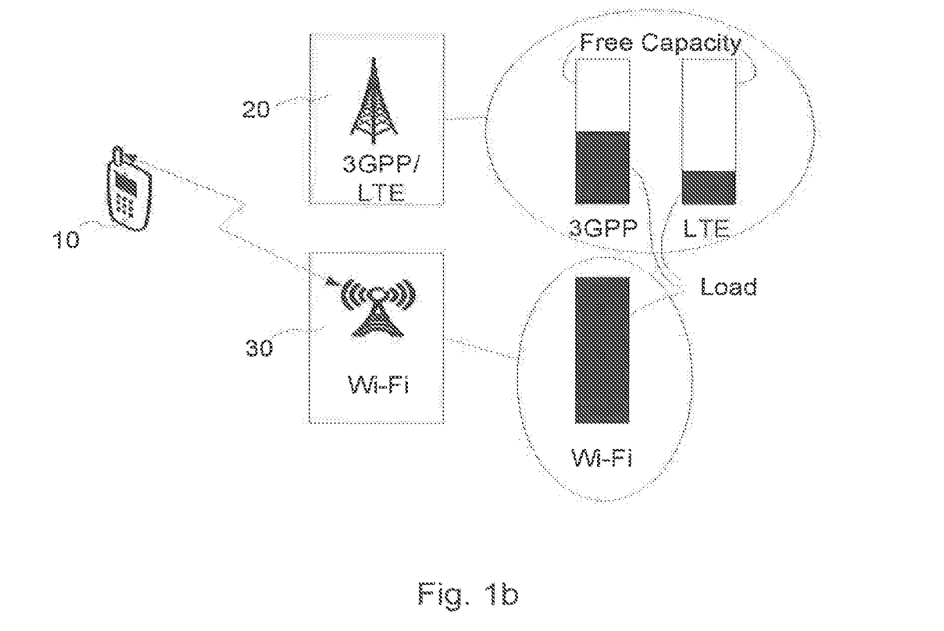

FIG. 1b illustrates the situation when no consideration of the load conditions in the mobile network 20 and Wi-Fi network 30 are made. As illustrated, while the capacity of the Wi-Fi network 30 is full, the mobile network 20 has low load and a lot of free capacity. As such, the UE might still be offloaded to a Wi-Fi AP that is serving several UEs while the mobile network (e.g. LTE) that it was previously connected to is rather unloaded.

Figure 1C:
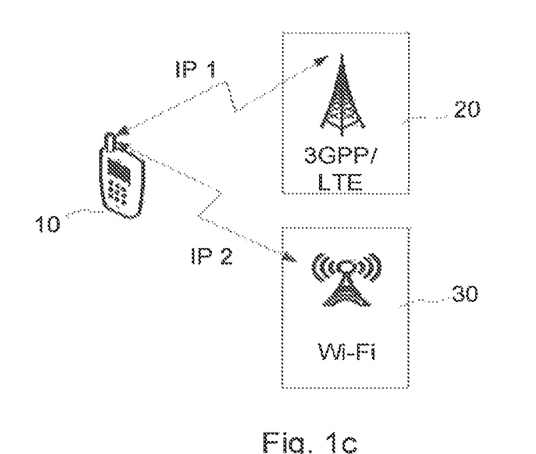

FIG. 1c illustrates the situation when interruptions of on-going services have occurred due to the change of IP address when the UE switches to the Wi-Fi network 30. For example, a user who started a Voice over IP (VoIP) call while connected to a mobile network 20 is likely to experience a call drop when arriving home and the UE switching to the Wi-Fi network automatically. Though some applications are smart enough to handle this and survive the IP address change (e.g. Spotify®), the majority of current applications do not. This places a lot of burden on application developers if they have to ensure service continuity.

Figure 1D:
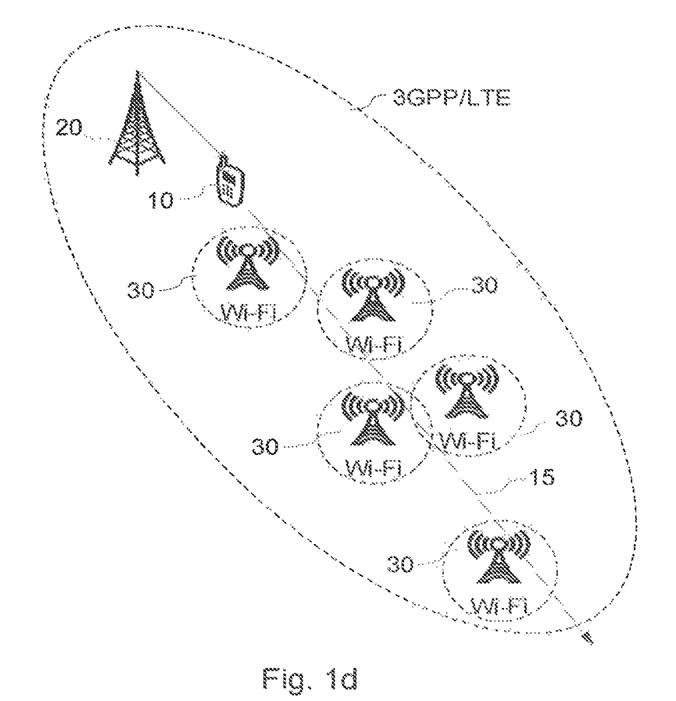

FIG. 1d illustrates the situation when no consideration of the UE's 10 mobility along a path 15 is made. The dotted line of the oval area is indicating the coverage of the 3GPP/LTE mobile network 20, the dotted lines of the circles indicate the coverage areas of local Wi-Fi network APs 30. Due to this, a fast moving UE 10 can end up being offloaded to a Wi-Fi AP 30 for a short duration, just to be handed over back to the mobile network 20. This is specially a problem in scenarios like cafes with open Wi-Fi, where a user walking by or even driving by the cafe might be affected by this. Such ping pong between the Wi-Fi and mobile network can cause service interruptions as well as generate considerable unnecessary signalling (e.g. towards authentication servers)

Recently, Wi-Fi has been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that can provide good support in their regular cellular networks. The term "operator-controlled Wi-Fi" points to a Wi-Fi deployment that on some level is integrated with a cellular network operators existing network and where the 3GPP radio access networks and the Wi-Fi wireless access may even be connected to the same core network and provide the same services.

There is currently quite intense activity in the area of operator-controlled Wi-Fi in several standardization organizations. In 3GPP, activities to connect Wi-Fi access points to the 3GPP-specified core network is pursued, and in Wi-Fi alliance, WFA, activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g., in peak-traffic-hours and in situations when the cellular network for one reason or another needs to be off-loaded, e.g. to provide requested quality of service, maximize bandwidth or simply for coverage.

SUMMARY

One object of some of the provided techniques in this disclosure is to specify UE behavior in reaction to rejection/disconnection from an access network.

According to one aspect of the following technique, a method and embodiments thereof are provided, wherein said method is a method in user equipment for access network selection between a first network and a second network. Said first and second networks comprise one or more access candidates. Said method comprise starting the access network selection procedure for one or more access candidates of the second network, and sequentially performing for the access candidates of the second network connection establishing attempts to one or more access candidates by selecting a new access candidate from said one or more access candidates, and performing connection establishing attempts to said access candidate until a connection to the access candidate is established or a stop criterion for said access candidate is fulfilled.

According to another aspect of the technique, a user equipment, UE, and embodiments thereof are provided, wherein said UE comprises a processor circuitry and a computer program comprising computer program code which, when run in a processor circuitry causes the UE to perform the steps of starting the access network selection procedure for one or more access candidates of the second network, and sequentially performing for the access candidates of the second network connection establishing attempts to one or more access candidates by selecting a new access candidate from said one or more access candidates, and performing connection establishing attempts to said access candidate until a connection to the access candidate is established or a stop criterion for said access candidate is fulfilled.

According to yet another aspect of the technique, a computer program and embodiments thereof are provided, wherein said computer program comprises computer program code which, when run in a processor circuitry of a user equipment, UE, causes the UE to perform the steps of starting the access network selection procedure for one or more access candidates of the second network, and sequentially performing for the access candidates of the second network connection establishing attempts to one or more access candidates by selecting a new access candidate from said one or more access candidates, and performing connection establishing attempts to said access candidate until a connection to the access candidate is established or a stop criterion for said access candidate is fulfilled.

According to further one aspect of the technique, a computer program product and embodiments thereof are provided, wherein said computer program product comprises a computer program as defined above and a computer readable means on which the computer program is stored. Said computer program comprises computer program code which, when run in a processor circuitry of a user equipment, UE, causes the UE to perform the steps of starting the access network selection procedure for one or more access candidates of the second network, and sequentially performing for the access candidates of the second network connection establishing attempts to one or more access candidates by selecting a new access candidate from said one or more access candidates, and performing connection establishing attempts to said access candidate until a connection to the access candidate is established or a stop criterion for said access candidate is fulfilled.

According to further one aspect of the technique, a carrier and embodiments thereof are provided, wherein said carrier contains the computer program as defined above and the carrier is one of an electronic signal, optical signal, radio signal or computer readable storage medium. Said computer program comprises computer program code which, when run in a processor circuitry of a user equipment, UE, causes the UE to perform the steps of starting the access network selection procedure for one or more access candidates of the second network, and sequentially performing for the access candidates of the second network connection establishing attempts to one or more access candidates by selecting a new access candidate from said one or more access candidates, and performing connection establishing attempts to said access candidate until a connection to the access candidate is established or a stop criterion for said access candidate is fulfilled.

One advantage with the above proposed techniques is that a UE will not try in vain to connect to an access node/network that it has been disconnected/rejected from. Further, one advantage is that UE may try to find the next best access node/network to connect to. Yet another advantage is that the suggested techniques will improve UE battery consumption of the UE, avoid unnecessary network signalling load, and improve the quality of experience of the user. It is also an advantage that the above suggested techniques guarantee predictable and testable UE behaviour.

BRIEF DESCRIPTION OF THE DRAWINGS

The foregoing, and other, objects, features and advantages of the present solutions will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present solutions. However, it will be apparent to one skilled in the art that the present solutions may be practiced in other embodiments that depart from these specific details. In other instances, detailed descriptions of well-known methods, devices, and circuits are omitted so as not to obscure the description of the present solutions with unnecessary detail.

The term "user equipment", or abbreviated "UE", will be used throughout this description for denoting a wireless communication device or any device which is capable of wireless communications. The term user equipment or UE may thus include any device, which may be used by a user for wireless communications. Accordingly, the term user equipment or UE may alternatively be referred to as a mobile terminal, a terminal, a user terminal (UT), a wireless terminal, a wireless communication device, a wireless transmit/receive unit (WTRU), a mobile phone, a cell phone, a table computer, a smart phone, etc. Yet further, the term user equipment or UE includes MTC (Machine Type Communication) devices, which do not necessarily involve human interaction. MTC devices are sometimes referred to as Machine-to-Machine (M2M) devices.

Following mechanisms provides the interworking of 3GPP and WLAN networks.

The Access Network Discovery and Selection Function (ANDSF) contain data management and control functionality necessary to provide network discovery and selection assistance data as per operators' policy, see references [1], [2] and [3]. By supplying information about available 3GPP and non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of flexible and efficient UE steering of access mechanisms, where policy control can guide UEs to select one particular RAN over another and where certain traffic should be routed to.

In a roaming scenario, the UE can be provided policies from both the ANDSF entities in the Home PLMN network (H-ANDSF) and the Visited PLMN network (V-ANDSF). In case there are policy conflicts between the two policy sets, the policies coming from the H-ANDSF take precedence, see ref. [3]. It is also worth noting that user preferences take precedence over both the H-ANDSF and V-ANDSF provided policies.

When communicating with the ANDSF server, the UE provides its location and profile to the ANDSF server. The UE's location can be specified in 3GPP cell IDs, 3GPP2 cell IDs, WiMAX cell IDs, WLAN SSIDs, or explicit geographical location. The UE profile can contain detailed information, such as device capabilities and OS type, which can be used by the ANDSF server to customize the ANDSF information to be sent to the UE. The information sent to the UE basically falls into the category of access network discovery or/and operator policies for access selection.

Rel-12 3GPP RAN level integration that is able to provide more operator control, enhanced user experience and system performance/utilization is required as operator controlled WLAN deployments become more common and WLAN usage increases. In order to address this RAN level integration, a study item, SI, was proposed in the 3GPP plenary meeting #58 that addresses the issue of (operator deployed/controlled) WLAN and 3GPP interworking at RAN level, see ref. [4]. The main aim of the SI was to find solutions that address the under-utilization of operator deployed WLANs, sub-optimal UE performance while connected to WLAN and battery drainage due to unnecessary WLAN scanning. Three solutions were proposed during the study item phase as described in ref. [5], named solutions 1, 2 and 3.

Figure 2:
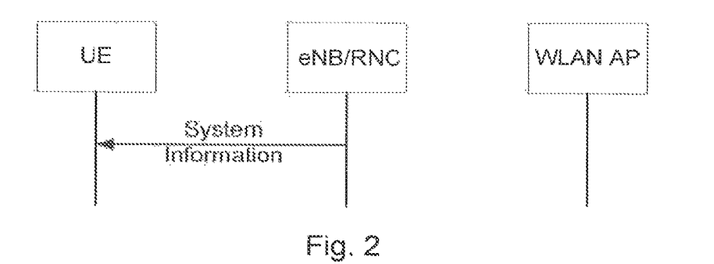
FIGS. 2, 3 and 4 are signalling schemes for illustrating different solutions for achieving final steering decisions to different access candidates, e.g. networks or access points of networks.

FIG. 2 is a signalling scheme illustrating solution 1, which is a UE based solution, i.e. UE makes final steering decision, where the ANDSF is enhanced with additional policies that uses 3GPP RAN assistance information provided to the UE through broadcast signalling, and optionally dedicated signalling. If there are no ANDSF policies deployed or the UE doesn't support it, then an enhanced proprietary Wi-Fi-if-coverage mechanism is used. The main assistance information provided to the UE is the RAN load: percentage load, load levels (low, medium, high), offload preference indicator, etc. Additionally, or alternatively, information such as maximum expected resource allocation for a UE on 3GPP, WLAN RSSI/BSS load thresholds, 3GPP RSRP/Received Signal Code Power (RSCP) thresholds that have to be fulfilled for traffic steering decisions.

The decisions are based on the RAN assistance information, UE measurements, information provided by WLAN and policies, or conditions that are obtained via ANDSF or via other Open Mobile Alliance Device Management (OMA-DM) mechanisms or pre-configured at the UE to steer traffic to WLAN or to RAN. For example, ANDSF ISRP rules can be enhanced to utilize the RAN assistance and WLAN provided information:

If RAN RSRP is less than a threshold s and RAN direct load is greater than a threshold x, and if WLAN RSSI is greater than a threshold r and WLAN BSS load is less than a threshold y, move flow to WLAN.

If RAN RSRP is greater than a threshold s' and RAN direct load is less than a threshold x', and if WLAN RSSI is less than a threshold r' and WLAN BSS load is greater than a threshold y', move flow to UMTS/LTE.

The value of the thresholds (e.g. RAN RSRP/RSCP thresholds) may also be provided by the ANDSF itself rather than included in the RAN assistance information.

Figure 3:
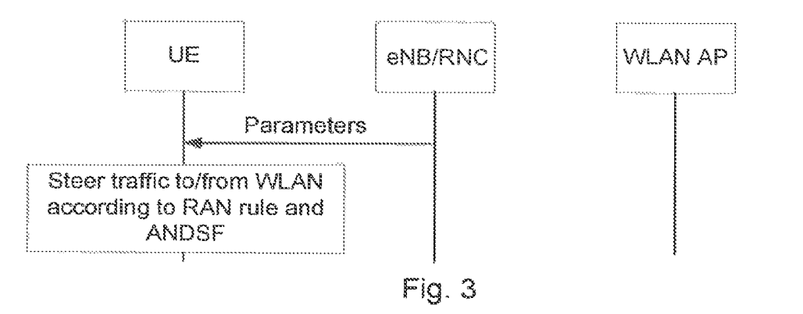

FIG. 3 is a signalling scheme illustrating solution 2, which follows principles similar to IDLE mode operations in 3GPP, where the UE follows RAN specified rules to perform cell (re-)selection. The RAN provides through dedicated and/or broadcast signalling thresholds which are used in the rules.

Below are a couple of examples of RAN rules to be specified for solution 2:

If measured_metric_A is less than a threshold1 and measured_metric_B is greater than a threshold2, move flow to WLAN.

If measured_metric_A is greater than a threshold3 and measured_metric_B is less than a threshold4, move flow to 3GPP.

In the examples above threshold1 to threshold4 are part of the parameters that are communicated from the RAN, measured_metric_A to measured_metric_B are measurement values the UE has gathered and the rules themselves are to be specified in RAN specifications. In additions to the RAN rules, ANDSF rules can also be used, e.g. for flow based traffic steering via ISRP.

Figure 4:
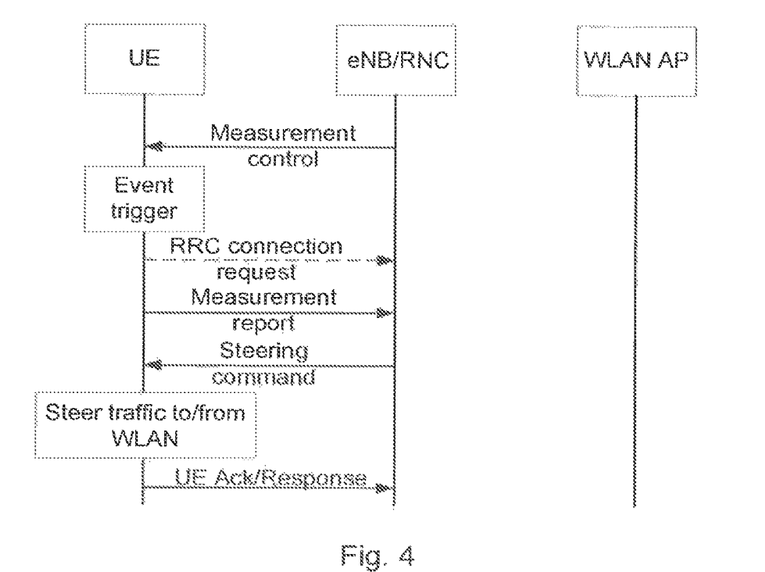

FIG. 4 is a signalling scheme illustrating solution 3, which follows principles similar to CONNECTED mode operations in 3GPP, where the following three main steps are employed for traffic steering:

Step 1. Measurement control configuration: the RAN sends information to the UE that includes details like the target WLAN(s) to be measured, e.g. specific identities such as SSIDs/BSSIDs/HESSIDs or more general information like operating frequencies, events/thresholds for triggering measurement reports, e.g. when WLAN signal becomes better/worse than a certain threshold, WLAN signal becomes better/worse than a certain threshold and 3GPP signal becomes worse/better than another threshold, etc.

Step 2. Measurement reporting: When the conditions for triggering thresholds, as configured in Step 1 above, are fulfilled, the UE sends a measurement report to the 3GPP RAN.

Step 3. Traffic steering: Based on the measurement report received in Step 2, the RAN evaluates the received measurements and other relevant information obtained in eNB/RNC and as a result of this sends a traffic steering command to the UE, which can specify the traffic to be steered. This can be explicit indication of each bearer to be moved i.e. by specifying DRB/RB-IDs or more general like the QoS Class Identifier (QCI), which can apply to many bearers at once.

Step 4. UE ACK/Response: In this step the UE indicates to the RAN whether or not the action dictated by the traffic steering command was successfully performed or not.

UEs in IDLE mode can request to setup an RRC connection for the sake of sending measurement reports when the conditions of Step 1 are satisfied. Alternatively, solution 1 or 2, which are equally applicable to both IDLE and CONNECTED UEs, might be employed for handling IDLE UEs while solution 3 is used only for CONNECTED UEs.

In the RAN #62 plenary meeting, a decision was made to go forward with a work item (WI) that proposes a solution that is a mixture of solution 1 and 2, see ref. [6]. The objective of this work item is to specify mechanism for WLAN/3GPP access network selection and traffic steering consisting.

For the Access Network Selection part:
Selected RAN assistance parameters transferred via system broadcast and/or dedicated signalling used within:
RAN rules defined within RAN WG specifications in case enhanced ANDSF is not deployed in the network or not supported by the UE.
ANDSF policies in case enhanced ANDSF is deployed in the network and supported by the UE.
RAN assistance information may be enhanced with WLAN identifiers, as described herein.

For the Traffic Routing part:
Selected RAN assistance parameters transferred via system broadcast and/or dedicated signalling used within:
RAN rules specified in RAN2 WG specifications in case enhanced ANDSF is not deployed or not supported by the UE.
ANDSF policies in case enhanced ANDSF is deployed in the network and supported by the UE.
RAN assistance information may be enhanced with traffic routing information (e.g. offload granularity) in case ANDSF is not deployed or not supported by the UE.

It has in 3GPP been discussed different mechanisms for provisioning WLAN identifiers from the network to the UE which indicates to the UE which WLANs should be considered in the WLAN interworking mechanism.

One example mechanism is that the 3GPP network broadcasts a set of SSIDs/BSSIDs/HESSIDs/etc. The UE would then for the WLANs corresponding to the broadcasted identifier evaluate whether or not to connect to such a WLAN. Other mechanisms which are based on dedicated signaling are also possible.

One problem to be solved is that the current behavior of the UE is not specified when the UE can't connect to the access network prioritized for steering by ANDSF/RAN, e.g. UE gets rejected before admission to the access network and the UE gets disconnects during normal operations with the access network, etc. For example, a UE might keep on trying to get connected to the access network that just rejected it several times before giving up, wasting UE battery, increasing network signaling load, and degrading the quality of experience of the user.

One object of some of the provided technique is to specify UE behavior in reaction to rejection/disconnection from an access network. Instead of repeatedly trying to reconnect to an access node/network that has rejected/disconnected it, a UE will find the next best access node/network to connect with. It says herein that the UE connects or disconnects from a WLAN. This may refer to that the UE connects or disconnects from a certain WLAN access point, i.e. a BSS, identified by a BSSID, or from a set of WLAN access points, i.e. an ESS, identified by an ESSID or HESSID.

It herein is also described how the UE selects an alternative access upon disconnection from a first access. It should be appreciated that disconnection here is not limited to the case when the UE has been connected to a WLAN and later gets disconnected, but the solutions presented herein also covers the case when the UE has been rejected from connection to a WLAN e.g. during the connection attempt to that WLAN. Furthermore, the UE might have been disconnected because of genuine problems in the network that do not account for deliberate steering, e.g. problem with credentials, loss of network connectivity, non-responding network nodes, etc.

It should also be appreciated that disconnection could also mean that traffic has been rejected and cannot be steered to a certain WLAN. For example a UE gets admitted to connect to a network node but is rejected to route traffic over that access.

When it herein says "connect to" it may mean one or more of the below:

Being "connected" to WLAN can mean different things, as exemplified by the existence of one or more of the below conditions:
Connection could be establishing communication link between the UE and the network node (or nodes), but not necessarily transmitting information;
Connection could be establishing a new communication link (when one was previously present, e.g. adding a "bearer");
Connection could be establishing a communication link and transmitting information over that communication link;
Connection could be starting to transmit information over a communication link that was previously established;
802.11 Open-system authentication. OSA (Authentication to the WLAN AP) has been completed or is under way;
802.1x EAP-SIM authentication (Authentication to the AAA-servers) has been completed or is under way;
Four way hand-shake between the UE and the WLAN network has been completed;
An IP address has been assigned to the UE in WLAN;
A PDN connection has been established through the WLAN network, i.e., a connection between the UE and the PDN gateway;
Data traffic has been started through the WLAN network.

In the following, a technique for selection of access candidates, e.g. access networks, will be presented. Said technique controls the user equipment to avoid connecting to an access node/network that it has been disconnected/rejected from. The following described technology enhances current ANDSF or RAN procedures when a UE can't connect to the access network prioritized for steering, e.g. UE gets rejected before admission to the access network, UE gets disconnects during normal operations with the access network, etc.

Figure 5:
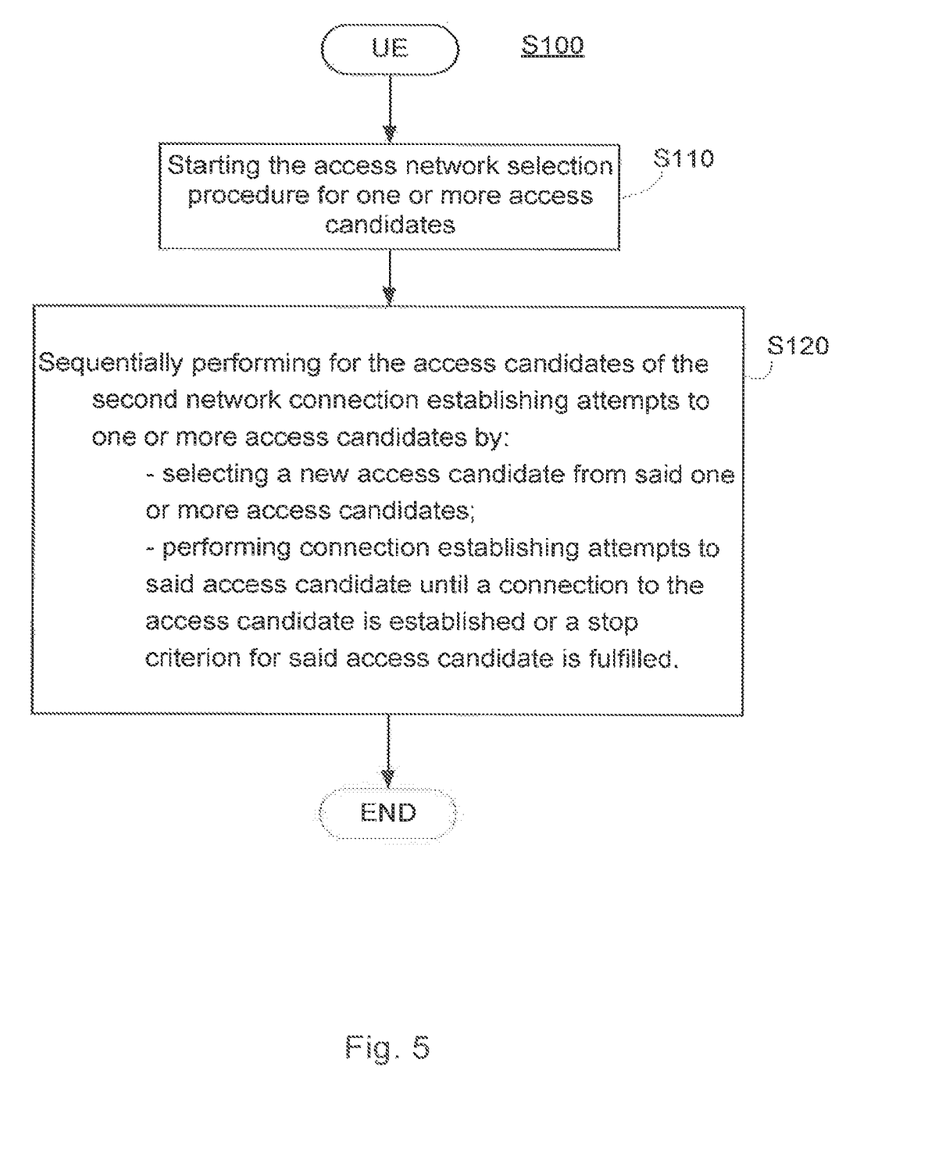
FIG. 5 is a flowchart of an embodiment of the method for access network selection.

FIG. 5 is a flowchart illustrating a method according one embodiment of the method for access network selection. The method may also be considered as a method for controlling connection attempts to alternative access candidates.

The method for access network selection is performed in a UE. According to the following embodiment, the method comprises:

S110:—Starting the access network selection procedure for one or more access candidates.

S120:—Sequentially performing for the access candidates of the second network connection establishing attempts to one or more access candidates by
- selecting a new access candidate from said one or more access candidates;
- performing connection establishing attempts to said access candidate until a connection to the access candidate is established or a stop criterion for said access candidate is fulfilled.

With new access candidate is meant an available alternative access candidate for which an attempt not has been performed. Different stop criterions may be used in step S120 for stopping the access network attempts, either alone or at the same time as a set of stop criteria. When one stop criterion of the set of stop criteria is fulfilled, the access network selection procedure for the access candidate is terminated.

According to one example, the stop criterion is that a rejection is received from the access candidate to which a connection establishing attempt is performed.

Another example of a stop criterion is based on a maximum time for a connection establishing attempt, i.e. when the maximum time for a connection establishing attempt to an access candidate is exceeded, the attempt is stopped. Said maximum time may be measured by a timer, which is set and started when a connection establishing attempt is started for an access candidate. Said maximum time may be pre-set of a vendor or operator. The maximum time may be per access network and/or node. It may also be so that there is one maximum time per group of access networks, e.g. one maximum time for accesses of a certain RAT. It may also be so that the maximum time applies to a group of access networks and/or nodes such as one maximum time for all WLANs with an SSID X. It would also be possible that there is one maximum time applicable to all access networks and/or nodes. The maximum time may be signalled from the network to the terminal.

Yet another example of a stop criterion is based on a maximum number of connection establishing attempts for establishing connection to an access candidate, i.e. when the maximum number of connection establishing attempts to an access candidate is exceeded, the attempt is stopped. Said number of attempts is measured/counted by a counter means. Said maximum number may be pre-set of a vendor or operator.

When a user equipment terminal is disconnected from an access, the UE will start, by step S110 in the method S100, connection attempts to alternative access candidates.

The UE terminal will upon disconnection from or rejection of connection attempt to an access node/network A, apply a policy/rule to select an alternative access candidate to connect to, e.g. node/network B. The policy/rule that instructs the UE to connect to the alternative access candidate B may be the same as the policy/rule which instructed the UE to connect to the access node/network A.

The alternative access may be of the same Radio Access Technology (RAT) as the first access. For example a UE gets disconnected from a first WLAN and then upon disconnection from that WLAN the UE connects to and/or steers traffic to a second WLAN.

The UE could be configured to consider a group of nodes in a network to be the same access. For example, an operator may have a first WLAN A, which could have an ESSID identifier "A", comprising three nodes; WLAN AP 1, WLAN AP 2 and WLAN AP 3, which could have a BSSIDs "1", "2" and "3", respectively, and a second WLAN B, which could have an ESSID identifier "B", comprising two nodes; WLAN AP 4 and WLAN AP 5, which could have a BSSIDs "4", and "5", respectively. According to this embodiment the UE can consider all the nodes of WLAN A to be one access, for example due to that they share the same ESSID, and all the nodes of WLAN B to be one access, for example due to that they share the same ESSID. Hence, according to some embodiments herein, if the UE gets disconnected from a node in WLAN A the UE would select WLAN B and connect to a node in WLAN B.

The UE could be configured to consider each node of a network to be different accesses, e.g. in the example above with WLAN A and WLAN B there would be in total 5 accesses; WLAN 1, WLAN 2, WLAN 3, WLAN 4 and WLAN 5. And according to some embodiments herein the UE could, upon disconnection from WLAN 1, select WLAN 2 to attempt to connect to, even though the ESSID for WLAN 1 and WLAN 2 is the same.

It would also be possible that the alternative access is of another Radio Access Technology compared to the first access. For example, a UE gets disconnected from a WLAN and then connects to and/or steers traffic to a 3GPP network.

For alternative access selection in step S120 different criteria may be used. In some embodiments the UE will select an alternative access given that the first access has indicated to the UE a certain cause value for the disconnection from the first access, while another cause value, or absence of cause value indication the UE would apply a default behavior, where the default behavior could be based on UE implementation and, as explained earlier, may be that the UE is reattempting to connect to the first access.

In one realization of this embodiment, a WLAN network indicates to the UE a cause value X at, or before, the disconnection of the UE. The UE will when being disconnected from the WLAN select alternative access, e.g. another WLAN or an access implementing another Radio Access Technology (RAT) such as a 3GPP RAT, and connect to that other access. However if the network indicates another cause value. e.g. cause value Y, or not providing any cause value, the UE would apply the default behavior which, as explained earlier, may be to try to reconnect to the first access candidate. The benefit of this embodiment is that the WLAN access can decide whether the UE should connect to an alternative access or apply some other behavior.

Different selection mechanisms for the alternative access can be applied in conjunction with the above embodiments of the method S100. Here after, a few example mechanisms are described.

The UE may select the alternative access candidate based on a priority order associated with alternative accesses. This priority order may be indicated by a network node, for example in an ANDSF policy, as described above or some other mechanism such as the RAN mechanism described above.

In one possible implementation of this embodiment the method S100 and a UE will upon disconnection, or rejection, from the first access candidate evaluate which access has second highest priority and then evaluate whether that access is available or not. Whether an access is available or not may be determined based on for example an ANDSF policy or some other mechanism such as the RAN mechanism described above. If the second highest priority access is available the UE would attempt to connect to that access, otherwise the UE would refrain from connecting to that access and evaluate which is the third highest priority access and whether the third highest priority access is available or not, and so on.

Regarding the access network selection procedure S100 in general: Say the UE has ANDSF rules or RAN policies that control the UE on how to do the access network selection. These policies/rules are always active in the UE. The embodiments proposed of the method S100 are just concerning once those policies/rules have fired, and on how to proceed. Example: a RAN rule that says if RSRP<x and there is a WLAN with RSSI>y, then connect to it. Also WLAN A, B, C . . . are listed according to decreasing priority (i.e. A is the most preferred). So at time x1: UE notices that it is in the coverage of WLANs belonging to A and C, and they fulfil the criteria, attempts to connect to A but gets rejected, then tries C, gets connected. 2 minutes after that, the UE notices that it is in the coverage of WLANs B and C. It is already connected to C but since B is of higher priority than C, it tries to connect to B.

Figure 6:
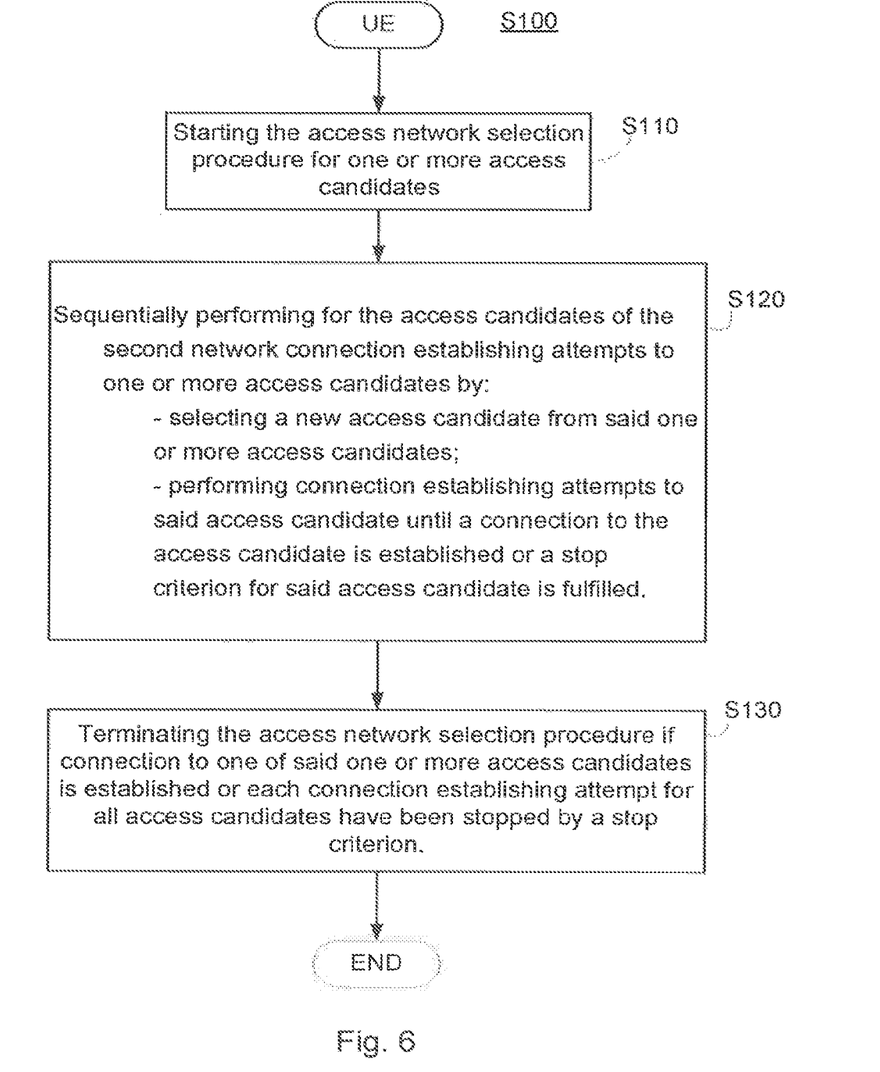
FIG. 6 is a flowchart of another embodiment of the method.

FIG. 6 is a flowchart illustrating a method according another embodiment of the method. As illustrated in the flowchart of this embodiment, the method may comprise a terminating step, which is optional.

The method S100 for access network selection procedure is performed in a UE. According to the following embodiment, the method comprises:

S110:—Starting the access network selection procedure for one or more access candidates;

S120:—Sequentially performing for the access candidates of the second network connection establishing attempts to one or more access candidates by selecting a new access candidate from said one or more access candidates;

performing connection establishing attempts to said access candidate until a connection to the access candidate is established or a stop criterion for said access candidate is fulfilled.

The method S100 comprises the optional terminating step, as illustrated:

S130:—Terminating access network selection procedure if connection to one of said one or more access candidates is established or each connection establishing attempt for all access candidates have been stopped by a stop criterion.

Figure 7:
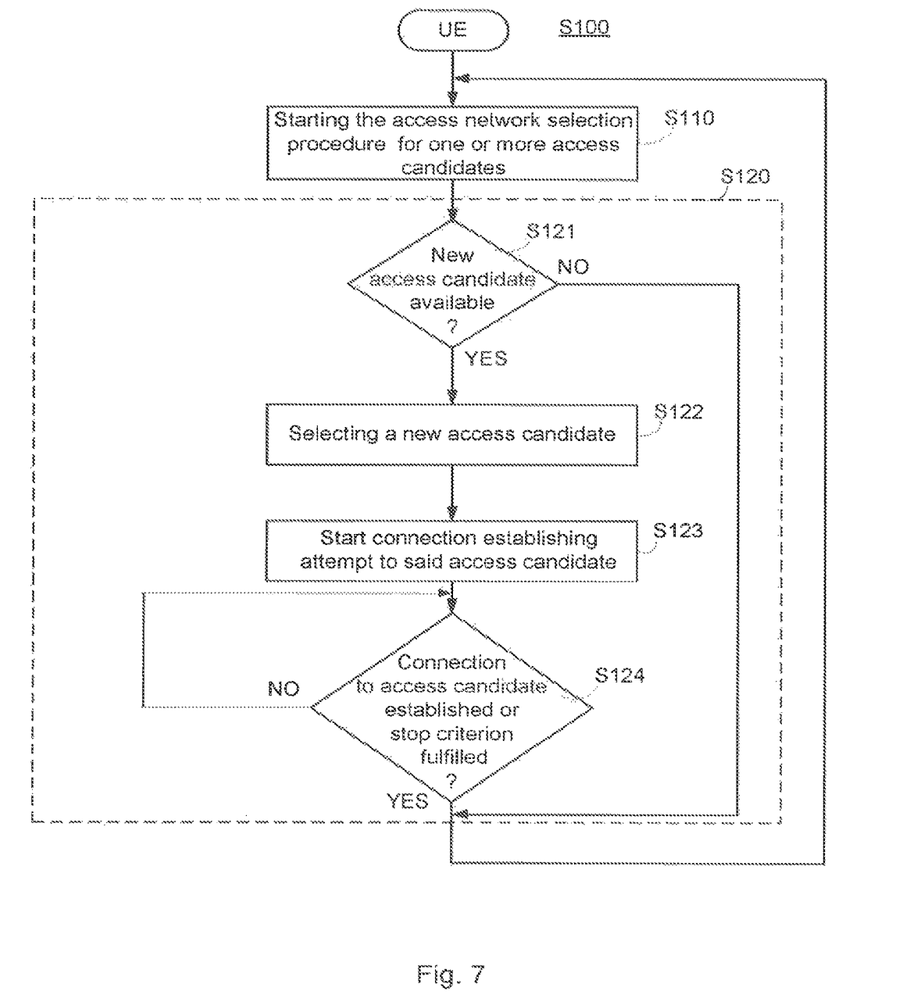
FIG. 7 is a flowchart of further one embodiment of the method.

FIG. 7 is a flowchart illustrating an embodiment of the method. In this embodiment of the method, the performing step S120 involves:

S121:—A new access candidate available? With new access candidate is meant an available access candidate for which an attempt not has been performed. If any new access candidate is not available, test criterion is not fulfilled, "NO", because all candidates have been tested without any connection being established. The process is then returned to S110, waiting for starting the access network selection procedure again. The process may be stopped in the terminating step, S130, if used in the embodiment, see FIG. 8 below. If a new access candidate is available, test criterion is fulfilled, "YES", and steps S122 and S123 are performed.

S122:—Selecting a new access candidate from said one or more access candidates.

S123:—Start connection establishing attempt to said access candidate. A connection establishing attempt may comprise one or more attempts to establish connection to the access candidate. When the connection establishing attempt has started, the procedure comprises a test, or check, step S124, wherein connection establishing attempts to said access candidate is performed until a connection to the is established or a stop criterion for said access candidate is fulfilled;

S124:—Connection to access candidate established or stop criterion fulfilled?

As soon as the criterion in S124 is fulfilled, YES, the attempt is stopped, The UE can use the established connection for sending and receiving signalling and data communication. As long as the criterion is not fulfilled, NO, the attempt/-s for the selected candidate is/are continuing if not one "stop criteria is fulfilled", which results in that the process leaves the test, S124, for step S121 for checking if a new access candidate is available, and if so, selecting a new candidate, S122, and restart the connection attempts, S123.

Figure 8:
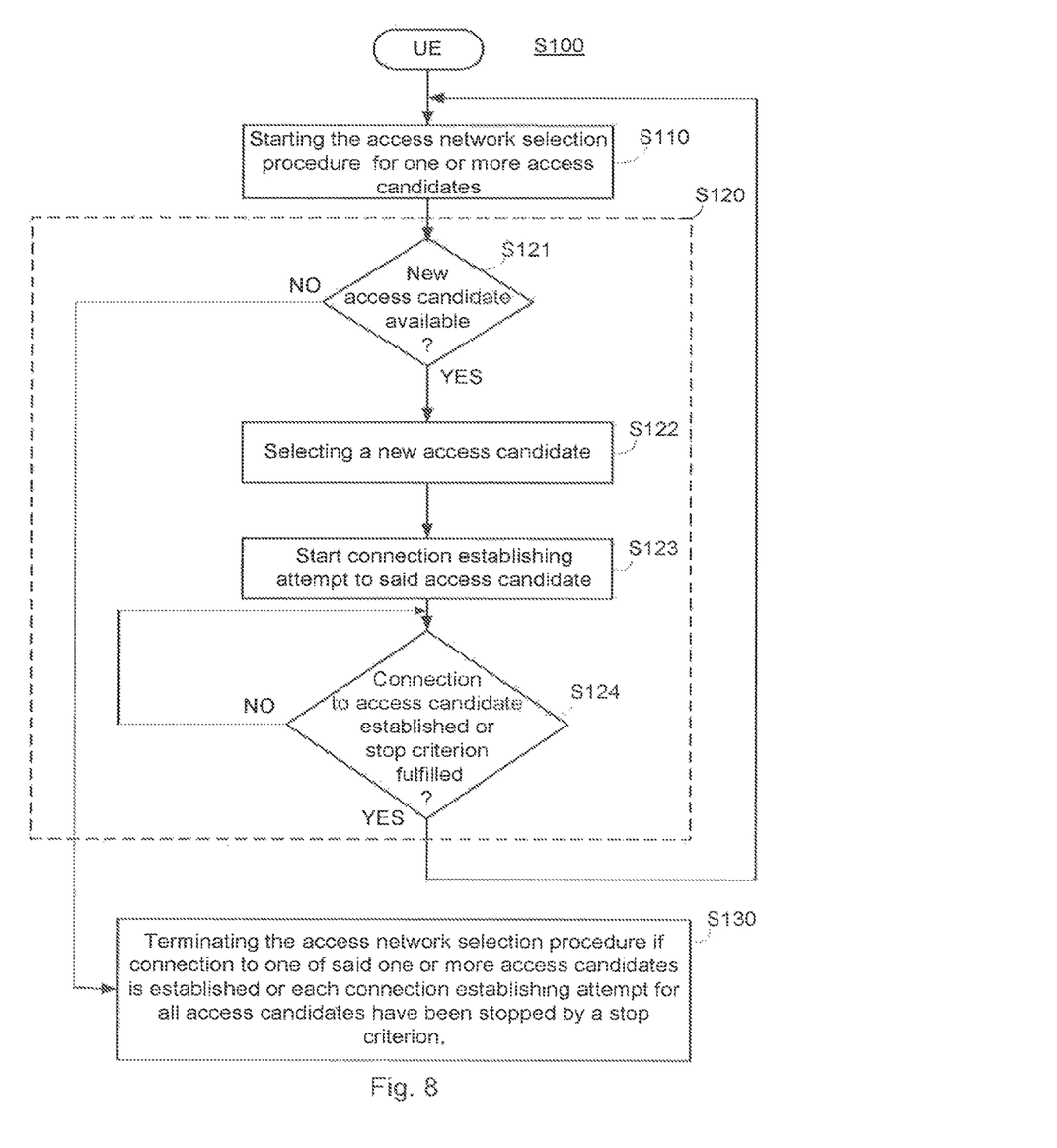
FIG. 8 is a flowchart of yet another embodiment of the method.

FIG. 8 is a flowchart illustrating an embodiment comprising the termination step, S130, of the method S100. The embodiment operates as the embodiment described above in FIG. 7, but if a new access candidate is not available, in test criterion in S121 is not fulfilled, "NO", because all candidates have been tested without any connection being established. The process is than stopped in the terminating step, S130.

Figure 9:
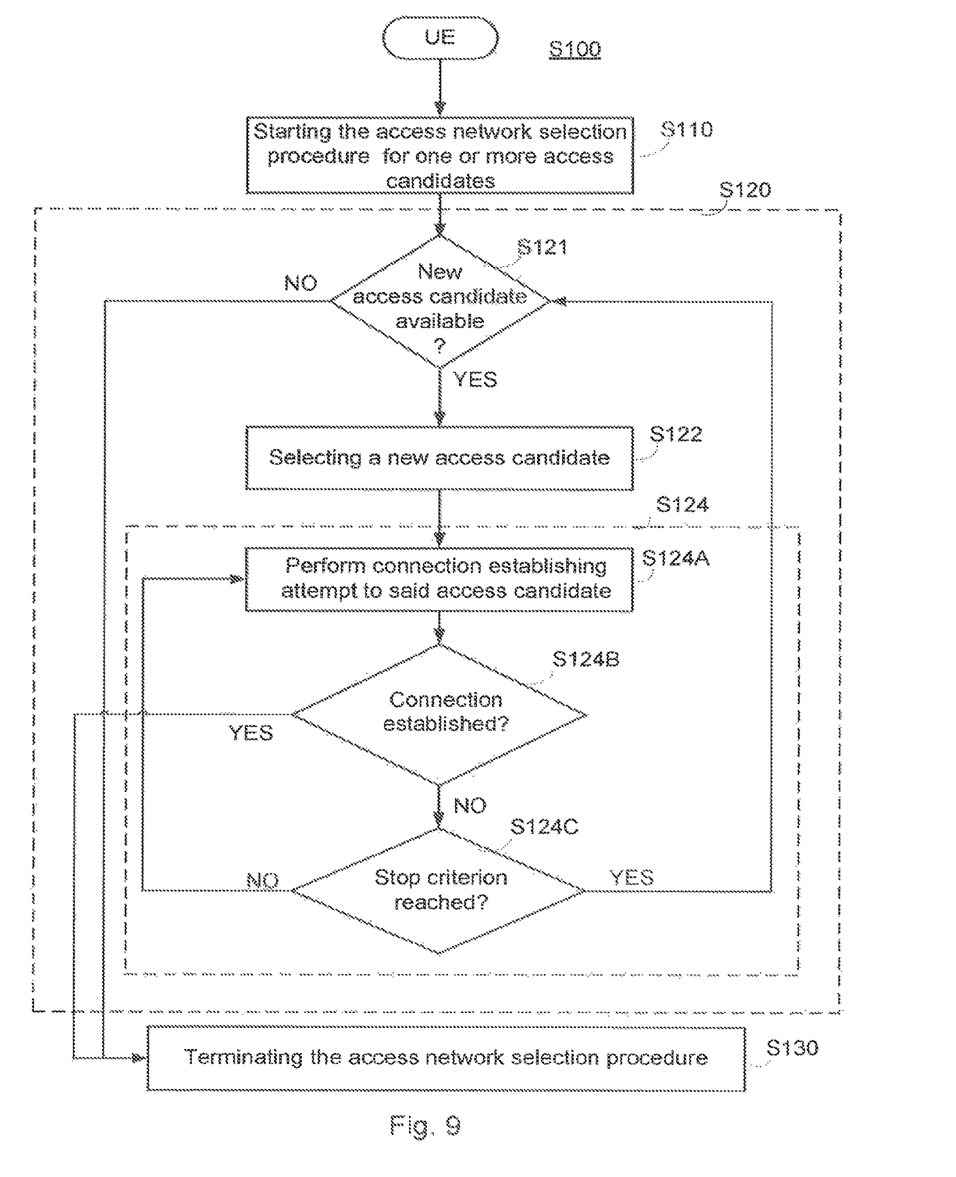
FIG. 9 is a flowchart of an additional embodiment of the method.

FIG. 9 is a flowchart illustrating an additional embodiment comprising the termination step, S130, of the method S100.

The method S100 starts when the UE is e.g. disconnected from the first network, and starts the access network selection procedure for one or more alternative access candidates, S110. When the method starts, there are usually a number of access candidates available. Whether, or not, there is one or more access candidate is tested in S121:

S121:—A new access candidate available? If any new access candidate is not available, test criterion is not fulfilled, "NO", because all candidates have been tested without any connection being established. The process is stopped directly in the terminating step, S130. If a new access candidate is available, test criterion is fulfilled, "YES", and step S122 is performed.

S122:—Selecting a new access candidate from said one or more access candidates. When a new access candidate is selected, e.g. due to a priority order and/or a cause value, step S124 is performed. Said step S124 involves three steps S124A, S124B, and S124C, constituting an inner access candidate connection establishing attempt loop, which now will be described.

S124A:—Perform connection establishing attempt to said access candidate. A connection establishing attempt may comprise one or more attempts to establish connection to the access candidate. When the connection establishing attempt has started, the procedure comprises a test, or check, step S124B:

Connection established? If the connection establishing attempts to said access candidate is successful, YES, a connection to the access candidate is established, and the method S100 is terminated in the terminating step, S130. However, if a stop criterion is reached in S124C, e.g. the number of attempts is exceeding the maximum number of attempts allowed, the method S100 is continuing by checking for a new access candidate, and if available, as confirmed by the test S121, a new access candidate is selected for the connection attempts. The method S100 is performed until a connection to the UE is established, YES, or a stop criterion for said access candidate is reached in S124C.

Regarding the selecting of a new access candidate from said one or more access candidates as in S120. i.e. step S122 in step S120. Different mechanisms or techniques for selecting alternative, or new, access candidates are hereafter exemplified. One such mechanism are to use a priority order of the access candidates.

a) The UE evaluates which of the access candidates available that has the highest priority. Consider for example a case where a UE has four access candidates, e.g. WLAN accesses, which should be considered and currently the UE is connected to one of these WLAN accesses. The UE could then, according to this mechanism, upon disconnection from, or upon connection attempt rejection from the WLAN the UE is currently connected to, evaluate which of the other three WLAN accesses has the highest priority and for that access candidate determine whether the access is available or not. If that WLAN is available the UE would attempt to connect to that access candidate, otherwise the UE would determine which of the other two access candidates has highest priority and then evaluate whether that access candidate is available or not. If that access candidate is available the UE would attempt to connect to that access otherwise the UE would evaluate whether the fourth access candidate is available and connect to that fourth access if available.

b) A priority list of available access candidates. In another possible implementation of this embodiment the UE will maintain a priority list of available access candidates. I.e. the UE will propagate the priority list only with access candidates which are available. The UE may evaluate for all considered access candidates whether they are available or not and then keep in the list only those access candidates which are available. This availability evaluation procedure may be done periodically and hence list of available accesses, i.e. access candidates, would be kept up-to-date in the sense that all lists in this list are considered available. In addition to or as an alternative to that, the UE may update the priority list when it gets rejected/disconnected with a specific cause value.

Consider for example a case where the UE has four WLAN accesses which should be considered; WLAN A, WLAN B, WLAN C and WLAN D. The UE would then evaluate for these access candidates which are considered available and which are not considered available. It may be so that only WLAN A, WLAN C and WLAN D are considered available and hence the list of available WLANs would only contain these three WLANs. If for example the UE is initially connected to (or is trying to connect to) WLAN A but then gets disconnected from (or is rejected from connecting to) WLAN A the UE would select one of the other WLANs. The UE may select out of those WLANs in the list of available WLANs the WLAN which has the highest priority.

Note that in the examples above, the candidate target list contained only WLANs. That is just for the sake of brevity, and the list candidate target can contain accesses belonging to other RATs as well.

The above described methods and embodiments thereof may be implemented in digital electronically circuitry, or in computer hardware, firmware, software, or in combinations of them. Devices, means, circuitry or units may be implemented in a computer program product tangibly embodied in a machine readable storage device for execution by a programmable processor; and method steps described above may be performed by a programmable processor executing a program of instructions to perform functions achieved by the method and embodiments thereof by operating on input data and generating output.

The described techniques may advantageously be implemented in one or more computer programs that are executable on a programmable system including at least one programmable processor, processing circuitry, processing means, etc. coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor, processor unit, processing circuitry, processing means, etc., will receive instructions and data from a read-only memory and/or a random access memory. Storage devices, such as computer readable means or computer readable storage medium, suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 10:
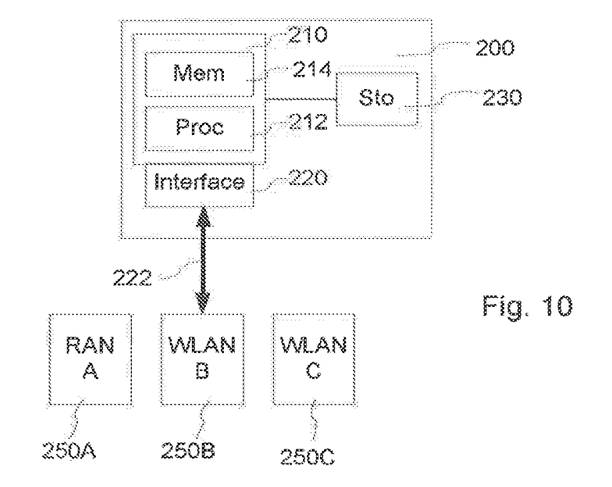
FIG. 10 is a block diagram illustrating one example of a user equipment, wherein the method is implemented.
Figure 11:
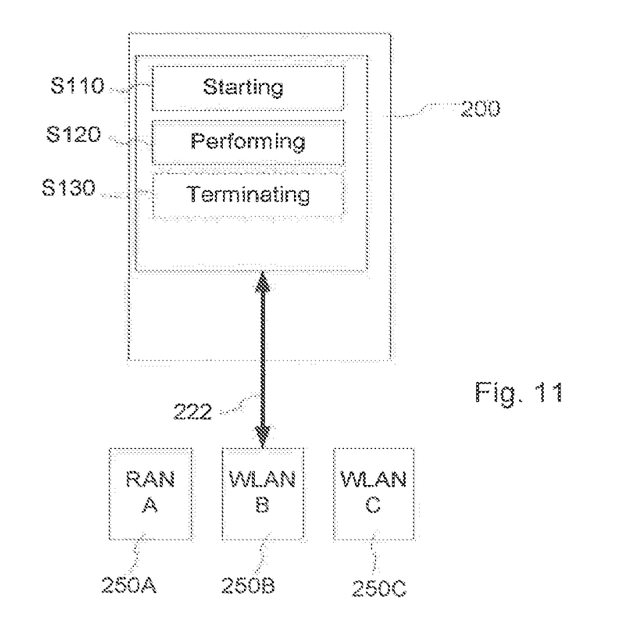
FIG. 11 is a block diagram illustrating another example of a user equipment, wherein the method is implemented.

FIGS. 10 and 11 are block schemes illustrating embodiments of a UE for implementing the above described method and its embodiments.

FIG. 10 is a block diagram illustrating one example of a UE 200, preferably a UE for communicating with a radio node 250 in a communications network, e.g. wireless communications network or telecommunications network supporting Wi-Fi by means of a WLAN 250B, 250C or any RAT by means of a RAN 250A. Thus, different access candidates exist for performing connection establishing attempts towards and to establish a connection 222 over an air interface. Said UE 200 is configured to perform connection establishing attempts. The UE comprises at least one processing circuitry 210 comprising a processor unit 212 and a memory storage 214. The UE 200 further comprises an interface 220 for enabling input and output communication 222 with other nodes, etc. The UE 200 may also comprise computer readable means or computer readable storage medium 230 on which a computer program is stored. Said means or medium 230 may be fixed in the UE or removable.

It is understood that said UE may comprise a different number of computer readable means or computer readable storage medium 230, and the illustrated number of computer readable means or computer readable storage medium 230 only is for illustrative purposes. One or several of the computer readable means or computer readable storage medium 230 may be physically separated from the other computer readable means or computer readable storage medium 230, or may reside on the same physical media.

Said processing circuitry 210 causes the UE to perform the steps of the above described method S100 and embodiments thereof. Thus, the processing circuitry 210 of the UE 200 is adapted to and operative to start an access network selection procedure for one or more access candidates, sequentially perform connection establishing attempts for the access candidates of the second network to one or more of the access candidates. Said processing circuitry 210 may also cause the UE to perform the step of terminating the access network selection procedure if connection to one of said one or more access candidates is established or each connection establishing attempt for all access candidates have been stopped by a stop criterion.

The stop criterion may be that a rejection is received from the access candidate to which a connection establishing attempt is performed, and/or a maximum time for a connection establishing attempt, and/or a maximum number of connection establishing attempts for establishing connection to an access candidate.

The UE 200 may be adapted, e.g. by means of the processing circuitry 210 to select a new access candidate from said one or more access candidate, to start a connection establishing attempt to said access candidate, to check if connection to an access candidate is established, and to check if a stop criterion is fulfilled.

The above mentioned embodiments may be implemented as processing circuitry 210 and a computer program comprising computer program code which, when run in a processor circuitry of a UE, causes the UE to perform the method steps of the method S100:

S110:—Starting the access network selection procedure for one or more access candidates;

S120:—Sequentially performing for the access candidates of the second network connection establishing attempts to one or more access candidates by
  selecting a new access candidate from said one or more access candidates;
  performing connection establishing attempts to said access candidate until a connection to the access candidate is established or a stop criterion for said access candidate is fulfilled; and optionally in some embodiments, S130:—Terminating access network selection procedure if connection to one of said one or more access candidates is established or each connection establishing attempt for all access candidates have been stopped by a stop criterion.

The computer program comprises computer program code which, when run in a processor circuitry of a node, causes the node to perform the different embodiments of the method S100, as described above.

It is further provided a computer program product comprising said computer program and a computer readable means on which the computer program is stored.

It is further provided a carrier containing the computer program, wherein the carrier is one of an electronic signal, optical signal, radio signal or computer readable storage medium.

FIG. 11 is a block diagram illustrating another example of one embodiment of a UE 200, preferably a UE for communicating with a radio node 250 in a communications network, e.g. wireless communications network or telecommunications network supporting Wi-Fi by means of a WLAN 250B, 250C or any RAT by means of a RAN 250A. Thus, different access candidates exist for performing connection establishing attempts towards and to establish a connection 222 over an air interface.

The above mentioned embodiments of the method S100 may be implemented as modules of a UE 200, said modules causes the UE to perform the method steps of the method S100.

The UE may therefore comprise a first module S110 for starting the access network selection procedure for one or more access candidates, a second module S120 for sequentially performing for the access candidates of the second network connection establishing attempts to one or more access candidates, and a third module S130 for terminating the access network selection procedure if connection to one of said one or more access candidates is established or each connection establishing attempt for all access candidates have been stopped by a stop criterion.

The UE 200 may comprise further modules for implementing the different embodiments of the method S100, said modules causes the UE to perform the different embodiments of the method S100. E.g. the UE 200 may comprise a counter means for enabling a stop criterion which is based on a maximum number of connection establishing attempts for establishing connection to an access candidate, i.e. when the maximum number of connection establishing attempts to an access candidate is exceeded, the attempt is stopped. Said number of attempts is measured/counted by the counter means. Another example is for enabling a stop criterion which is based on a maximum time for a connection establishing attempt, i.e. when the maximum time for a connection establishing attempt to an access candidate is exceeded, the attempt is stopped. Said maximum time may be measured by a timer, which is set and started when a connection establishing attempt is started for an access candidate. The user equipment may comprise a module for handling stop criterion received, e.g. at a rejection from the access candidate to which a connection establishing attempt is performed. The user equipment may comprise a module for handling cause values e.g. in a received rejection, said cause value indicating an alternative access candidate for the user equipment to select. The cause value may also indicate selection of an alternative access candidate implementing a Radio Access Technology which differs from the Radio Access Technology used in the first network. The user equipment may also be adapted to at an absence of a default value, or the cause value is indicating for the user equipment, to perform a default behaviour.

The user equipment may further comprise a module for selecting one alternative access candidate based on a priority order. The UE may be adapted to evaluate which of the access candidates available has the highest priority.

The user equipment may further comprise a module for maintaining the priority list with a list of available access candidates. Said list of available access candidates may be updated, e.g. at rejection or disconnection with a specific cause value.

The modules described above with reference to FIGS. 10 and 11 may be considered as logical units, and do not necessarily correspond to separate physical units or modules. Thus, the person skilled in the art would appreciate that the units disclosed in the FIGS. 10 and 11 may be implemented as physically integrated units, and/or physically separate units, and that the units are provided with appropriate processing circuits.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

A number of embodiments of the described method and UE have been described. It will be understood that various modifications may be made without departing from the scope of the following claims. Therefore, other implementations are within the scope of the following claims.

ABBREVIATION LIST

WLAN Wireless Local Area Network
PDN Public Data Network
3GPP Third Generation Partnership Project
LTE Long Term Evolution
UMTS Universal Mobile Telecommunications System
WCDMA Wideband Code Division Multiple Access
GSM Global System for Mobile Communications
PLMN Public Land Mobile Network
RAN Radio Access Network
RAN WG Radio Access Network Working Group
RAT Radio Access Technology
IP Internet Protocol
eNB base (transceiver) station in LTE systems
RNC Radio Network Control
RRC Radio Resource Control
AP Access Point
BSS Basic Service Set
ESS Extended Service Set
SSID Service Set IDentification
BSSID Basic Service Set IDentification
HESSID Homogenous Extended Service Set IDentification
RSSI Received Signal Strength Indicator
ISRP Inter System Routing Policy
RSRP Reference Signal Received Power
DRB Data and Signalling Radio Bearers
RB-ID Radio Bearer IDentification
EAP-SIM Extensible Authentication Protocol Subscriber Identity Module
AAA Authentication, Authorization and Accounting

REFERENCE LIST

[1] 3GPP TS 23.402, Architecture enhancements for non-3GPP accesses
[2] 3GPP TS 24.312, Access Network Discovery and Selection Function (ANDSF) Management Object (MO)
[3] 3GPP TS 24.302, Access to the 3GPP Evolved Packet Core (EPC) via non-3GPP access networks; Stage 3
[4] RP-122038—New Study Item Proposal on WLAN/3GPP Radio Interworking, Intel Corporation
[5] 3GPP TR 37.834: WLAN/3GPP Radio Interworking
[6] 3GPP RP-132101, New Work Item Proposal on WLAN/3GPP Radio Interworking

The invention claimed is:

1. A user equipment, UE, for access network selection between a first network associated with a first Radio Access Technology (RAT) and a second network associated with a second RAT, the UE comprising:
a processor circuitry; and
a computer program comprising computer program code which, when run by the processor circuitry causes the UE to:
obtaining assistance information indicating a load of the first network associated with the first RAT;
based on the assistance information, determining that the UE should transition from the first network associated with the first RAT to the second network associated with the second RAT;
for a group of access candidates within a plurality of access candidates associated with the second RAT, sequentially perform access attempts to the plurality of access candidates by:
selecting a new access candidate from said plurality of access candidates associated with the second RAT; and
performing connection establishing attempts to said access candidate until a connection to the access candidate is established or a stop criterion is fulfilled,
wherein if a cause value is indicated at, or before the disconnection of the UE, the selecting is based on the cause value indicating an alternative access candidate for the user equipment to select, and
wherein the stop criterion is based on a maximum time for attempting to establish connections with the group of access candidates within the plurality of access candidates of the second network, each access candidate within the group of access candidates associated with the second RAT.

2. The user equipment according to claim 1, wherein the processing circuitry is further operable to run the computer program code to cause the UE to:
terminate the access network selection procedure if connection to one of said one or more access candidates is established or the stop criterion is fulfilled.

3. The user equipment according to claim 1, wherein the cause value indicates selecting an alternative access candidate implementing a Radio Access Technology which differs from the Radio Access Technology used in the first network.

4. The user equipment according to claim 1, wherein an absence of a default value or the cause value is indicating for the user equipment to perform a default behaviour.

5. The user equipment according to claim 1, wherein the user equipment sequentially selects the plurality of access candidates based on a priority order.

6. The user equipment according to claim 5, wherein the UE is adapted to evaluate which of the plurality of access candidates available that has the highest priority.

7. The user equipment according to claim 5, wherein the user equipment is adapted to maintain a priority list with a list of the plurality of access candidates.

8. The user equipment according to 7, wherein the user equipment is adapted to update said list of the plurality of access candidates.

9. The user equipment according to claim 7, wherein the user equipment is adapted to update said list of the plurality of access candidates when the user equipment gets rejected or disconnected with a specific cause value.

10. The user equipment according to claim 1, wherein the second network is implementing an alternative Radio Access Technology than the Radio Access Technology of the first network.

* * * * *